United States Patent Office 3,114,233
Patented Dec. 17, 1963

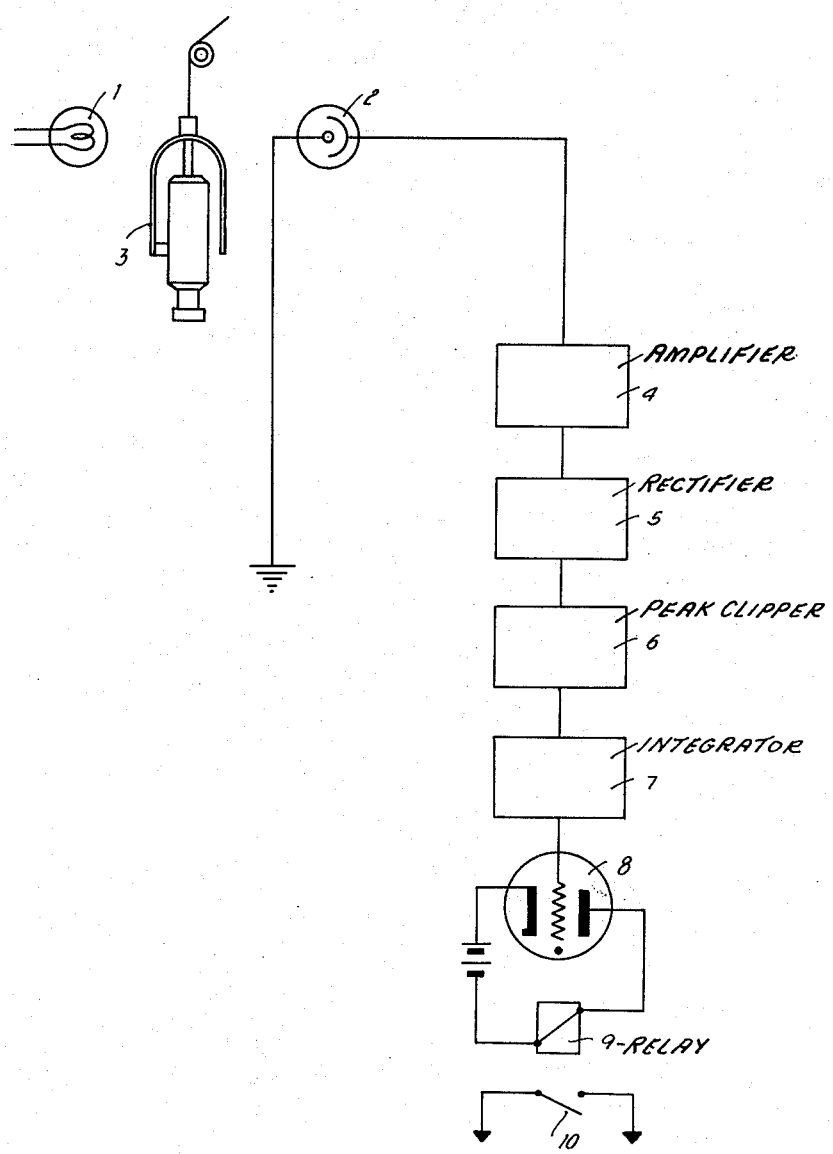

3,114,233
AUTOMATIC ELECTRONIC SYSTEM FOR THE CONTROL OF SLIVER RUPTURES IN ROVING FRAMES
Antonio Viaplana Guri, Paseo Manuel Girona 42, Barcelona, Spain
Filed May 31, 1960, Ser. No. 32,950
Claims priority, application Spain May 30, 1959
7 Claims. (Cl. 57—81)

The present invention relates to an automatic electronic system for the control of sliver ruptures in roving frames.

It is a well known fact that when the rupture of a sliver takes place within one of the coiler arms, and often between the coiler arm and the associated spinning drawing rollers, the sliver which is being continually supplied by the latter is prone to entangle itself in the upper part of the said coiler arm thereby producing a bundle of loose sliver. This incident, besides leading to the stoppage of the machine in order to permit tieing up the broken sliver, with the corresponding loss in production, is liable to extend to the adjacent spindles thereby worsening the problem and increasing the above loss, at the same time that it restricts the number of spindles that a single worker can attend to.

Thus, the object of the present invention is an electronic system by means of which a given number of spindles of a roving frame may be controlled in order to automatically cause the stoppage of the machine when a sliver rupture takes place, or merely to indicate that the said rupture has taken place.

With this in mind, the system comprises an optic path running tangentially to the zones of the coiler arms where the said sliver bundles are formed and in such a manner that it may be cut off by the same, between a light source and a photosensitive device to the changes in incident light, so that the said photosensitive device generates or allows the passage of an electric pulse every time the bundle cuts off the path, the said device being connected with a relay device by means of a suitable adapter system, the said relay operating warning devices or stopping means for the machine when the same is energized.

Within the above specification it should be had in mind that in the terms "light source" and "photosensitive device" are included the devices operating with radiations of a wavelength such that they are comprised within the detectable spectrum, as well as those which lie outside the above range, such as the infra-red and ultra-violet rays, and the present invention should not be restricted to any of the above specific types of radiations.

In accordance with a preferred embodiment, the optic path is arranged tangentially to a plurality of coiler arms and it may extend along the whole machine, with a light source and a photosensitive device for each side of the same or, otherwise, the optic path may be formed around the machine with a single light source and a single photoelectric cell combined with reflecting devices in order to deviate the light beam in the suitable points. However, in order to make more easy the location of the point of the machine where the breakage occurred, the optic paths may also be restricted to a given number of spindles.

Another feature of the invention resides in the special adapting circuit which includes, in series and in the direction from the photoelectric device to the relay a voltage amplifier which enlarges the pulses generated or allowed to pass by the photoelectric device, a rectifier network given the same sense to all of the amplified pulses, a peak remover network reducing the amplitude of the pulses to a previously established constant value in order to obtain a more uniform output at the end of the system, and a time constant or integrating device which operates the relay when a suitable potential level is attained.

The amplifier, the rectifier and the peak remover devices may be conventional networks, many embodiments of which may be found in the literature of the art and, therefore, it is not necessary to describe them in detail. As regards the time constant or integrating network, it may consist of a RC circuit of a conventional type, which preferably includes a leakage device which may be previously adjusted to a suitable value or it may be of adjustable condition in order to provide for changing of the number of pulses which are necessary to cause operation of the relay. This has the advantage of allowing the machine to operate in a continuous manner when isolated pulses take place but they are not due to effective ruptures of some of the slivers.

As a relay, any of the known devices may be used, for example a gas discharge tube with its control electrode connected to the output of the integrating device and the plate circuit of which is used to cause operation of the warning signal or the machine stop motion, or, otherwise, an electromagnetic or electrothermic relay of known construction, which also causes the above operations. The bias of the electronic relay electrodes may be the most suitable to each case and in accordance with the selected working procedure. Thus, for example, it may be lower and of the same polarity as the output potential of the integrating network, so that both voltages add to one another in order to attain the tripping or actuating bias, but, if necessary, the control electrode of the electronic relay may also be biased with a higher voltage, that is, of a polarity opposite to that of the integrator network so that the same operating bias of the gas tube is obtained through a differential effect. As regards the electromagnetic or electrothermic relay it may be used with open circuit apparatus as well as a closed circuit one, provided with normally open or closed position contacts, as it may be suitable for every special embodiment, and to which end only slight detail changes should be made in the system as it will appear to the expert in the art.

In order that the present invention may be readily carried into effect, it will now be disclosed with reference to the accompanying drawing, wherein:

The single FIGURE is a schematic block diagram of an embodiment of the circuit arrangement of the present invention.

In the figure, two light sources 1, which may comprise for example, incandescent lamps, face to respective photoelectric cells 2 or equivalent devices, mounted in the machine so that their luminous paths run adjacent the coiler arms 3, and, more specifically, tangential to the point where the broken slivers entangle.

In accordance with the above, during normal operation of the machine, light beams are not cut off and the cells, suitably biased, allow passage of a constant current which does not change the condition of the system. When a sliver entanglement takes place as a consequence of a sliver breaking, on the contrary, the corresponding luminous beam is cut off at every turn of the coiler arm so that the cell produces some variations in the form of pulses having a longer or shorter duration, separated by intervals depending upon the shape and size of the entanglement formed.

The voltage pulses thus obtained are enlarged in the amplifier 4 in order to give to the same an amplitude which is suitable for the following stage where they are rectified by the rectifier 5 with the purpose of giving them the same sign. Thereafter, the pulses are trimmed by the peak clipper 6 in order to make operation of the following devices independent of the variations in amplitude of the incoming pulses.

The pulse trains thus obtained are integrated in the integrating network 7 so that when the driving voltage for the thyratron 8 is obtained at the output of the same, the said thyratron is rendered conductive and causes energization of the electromagnetic relay 9 which controls the driving circuit 10 to cause stoppage of the machine or operation of a warning device.

The integrating or RC network includes a leakage device, for example a resistor bypassing the integrating capacitor, the value of which is so chosen that operation of the relay 8 is obtained only when the electricity amount necessary to obtain the tripping voltage is attained in a predetermined length of time, so that the automatic stop motion is not initiated until an effective entanglement occur and not when isolated pulses occur, for example due to a momentary crimping of the sliver at one of the coiler arms. This resistor may be adjustable in order to vary the effective time constant of the network in each application case. If necessary, the RC circuit may be dispensed with and a delayed operation relay 9 may be used.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended with the meaning and range of equivalence of the following claims.

What is claimed as new and desired to be secured by Letters Patent is:

1. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time; and operating means coupled to said converting means, said operating means being adapted to perform a predetermined operation under the control of said control pulse.

2. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time, said converting means including circuit means for producing said control pulse said predetermined period of time after a predetermined voltage level is reached in said circuit means; and operating means coupled to said converting means, said operating means being adapted to perform a predetermined operation under the control of said control pulse.

3. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time, said converting means including circuit means for producing said control pulse when a predetermined voltage level is reached in said circuit means and is maintained for at least said predetermined period of time; and operating means coupled to said converting means, said operating means being adapted to perform a predetermined operation under the control of said control pulse.

4. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosentitive device to a control pulse after a predetermined period of time, said converting means including circuit means for producing said control pulse when at least a predetermined number of pulses is received from said photosensitive device in said predetermined period of time; and operating means coupled to said converting means, said operating means being adapted to perform a predetermined operation under the control of said control pulse.

5. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time, said converting means comprising amplifier means coupled to said photosensitive device for amplifying the pulses produced by the said photosensitive device, rectifier means coupled to said amplifier means for passing amplified pulses of one polarity and blocking amplified pulses of the other polarity, peak clipper means coupled to said rectifier means for clipping the peaks of pulses passed by said rectifier means, and integrator means coupled to said peak clipper means for producing a control pulse from the clipped pulses provided by said peak clipper means, said integrator means having a time constant adjustable to determine said predetermined period of time during which a prerequisite condition of said clipped pulses must be maintained before said control pulse is produced; and operating means coupled to said integrator means, said operating means being adapted to perform a predetermined operation under the control of said control pulse.

6. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time, said converting means comprising amplifier means coupled to said photosensitive device for amplifying the pulses produced by the said photosensitive device, rectifier means coupled to said amplifier means for passing amplified pulses of one polarity and blocking amplified pulses of the other polarity, peak clipper means coupled to said rectifier means for clipping the peaks of pulses passed by said rectifier means, and integrator means coupled to said peak clipper means for producing a control pulse from the clipped pulses provided by said peak clipper means, said integrator means having a time constant adjustable to determine said predetermined period of time during which a prerequisite condition of said clipped pulses must be maintained before said control pulse is produced; and operating means coupled to said integrator means, said operating means being adapted to perform a predetermined operation under the control of said control pulse and including relay means and relay driving means comprising a thyratron controlled by said control pulse.

7. A circuit arrangement for detecting a rupture of a material on a rotating spindle, said circuit arrangement comprising, in combination, a photosensitive device positioned in spaced relation to said material, said photosensitive device being sensitive to changes in incident light thereon; a light source positioned in spaced relation to said material in a manner whereby said light source directs a beam of light to said photosensitive device tangential to said material so that when said material is in a whole condition said photosensitive device receives a beam of light from said light source and produces a substantially constant current and when said material is ruptured it bunches around said rotating spindle in a bundle and interrupts the beam of light from said light source and said photosensitive device produces a plurality of current pulses of a number, duration and separation dependent upon the rate of rotation of said rotating spindle and the space occupied by the bundle of material; converting means coupled to said photosensitive device for converting the current pulses produced by said photosensitive device to a control pulse after a predetermined period of time, said converting means comprising amplifier means coupled to said photosensitive device for amplifying the pulses produced by the said photosensitive device, rectifier means coupled to said amplifier means for passing amplified pulses of one polarity and blocking amplified pulses of the other polarity, peak clipper means coupled to said rectifier means for clipping the peaks of pulses passed by said rectifier means and integrator means coupled to said peak clipper means for producing a control pulse from the clipped pulses provided by said peak clipper means, said integrator means having a time constant adjustable to determine said predetermined period of time during which a prerequisite condition of said clipped pulses must be maintained before said control pulse is produced; and operating means coupled to said integrator means, said operating means being adapted to perform a predetermined operation under the control of said control pulse and including delayed-acting relay means and relay driving means controlled by said control pulse.

References Cited in the file of this patent

UNITED STATES PATENTS

| | | |
|---|---|---|
| 2,364,824 | Scott | Dec. 12, 1944 |
| 2,565,500 | Ingham | Aug. 28, 1951 |
| 2,711,093 | Edelman et al. | June 21, 1955 |
| 2,936,511 | Wilson | May 17, 1960 |